United States Patent
Deak et al.

(10) Patent No.: US 9,389,099 B2
(45) Date of Patent: Jul. 12, 2016

(54) MULTI-TURN ABSOLUTE MAGNETIC ENCODER

(71) Applicant: MultiDimension Technology Co., Ltd., Zhangjiagang (CN)

(72) Inventors: James Geza Deak, Zhangjiagang (CN); Zhimin Zhou, Zhangjiagang (CN)

(73) Assignee: MultiDimension Technology Co., Ltd. (CN)

( * ) Notice: Subject to any disclaimer, the term of this patent is extended or adjusted under 35 U.S.C. 154(b) by 0 days.

(21) Appl. No.: 14/760,355

(22) PCT Filed: Jan. 10, 2014

(86) PCT No.: PCT/CN2014/070472
§ 371 (c)(1),
(2) Date: Jul. 10, 2015

(87) PCT Pub. No.: WO2014/108096
PCT Pub. Date: Jul. 17, 2014

(65) Prior Publication Data
US 2015/0369636 A1    Dec. 24, 2015

(30) Foreign Application Priority Data

Jan. 11, 2013  (CN) .......................... 2013 1 0011438

(51) Int. Cl.
*G01B 7/14* (2006.01)
*G01D 5/249* (2006.01)
*G01D 5/14* (2006.01)

(52) U.S. Cl.
CPC .............. *G01D 5/2497* (2013.01); *G01D 5/145* (2013.01); *G01D 5/147* (2013.01)

(58) Field of Classification Search
CPC ......... G01P 3/443; G01P 3/488; G01P 3/487; G01P 3/481; G01P 3/685; G01P 3/66; G01P 3/68; G01P 3/665; G01P 1/026; G01D 5/145; G01D 5/147; G01D 5/2457; G01D 5/2013; G01D 5/2046; G01R 33/09; G01B 7/30; G01B 7/003; G01B 7/14
USPC ................. 324/173–174, 178–179, 161, 162, 324/207.2–207.25, 259
See application file for complete search history.

(56) References Cited

U.S. PATENT DOCUMENTS 5,789,917 A * 8/1998 Oudet ...................... G01B 7/30
                                                     324/207.2
6,542,088 B1   4/2003  Bielski et al.
(Continued)

FOREIGN PATENT DOCUMENTS

CN     101253389 A    8/2008
CN     201748928 U    2/2011
(Continued)

OTHER PUBLICATIONS

International Application No. PCT/CN2014/070472, International Search Report mailed Apr. 25, 2014, 8 pgs.
(Continued)

*Primary Examiner* — Tung X Nguyen
*Assistant Examiner* — Thang Le
(74) *Attorney, Agent, or Firm* — Schwegman, Lundberg & Woessner, P.A.

(57) ABSTRACT

A multi-turn absolute magnetic encoder, comprising (M+1) counting units, a single-turn signal processing unit, and a multi-turn signal processing unit. Each counting unit comprises counting wheels with a cylindrical ring permanent magnet fixed thereon, and a tunneling magnetoresistive angular displacement sensor. The magnetoresistive angular displacement sensor is located within a region in a detection plane of the permanent magnet at within a specific radius range from the axis of the cylindrical ring permanent magnet, within the detection plane the angle of a component of a magnetic field generated by the permanent magnet is linearly proportional to the rotation angle of the cylindrical ring permanent magnet. The single-turn signal processing unit calculates and outputs a code characterizing the absolute angular position of the input shaft based on the sensor signal of the first counting unit; and the multi-turn signal processing unit calculates and outputs the integer number of turns of the input shaft based on the sensor signals of the second counting unit to (M+1) counting units.

12 Claims, 12 Drawing Sheets

(56) References Cited

U.S. PATENT DOCUMENTS

| | | | | |
|---|---|---|---|---|
| 7,023,202 | B2* | 4/2006 | Hagino | G01D 5/145 |
| | | | | 324/207.2 |
| 7,030,606 | B2* | 4/2006 | Kato | G01D 5/145 |
| | | | | 324/207.2 |
| 7,378,838 | B2* | 5/2008 | Mizutani | G01D 5/145 |
| | | | | 324/207.2 |
| 7,808,234 | B2 | 10/2010 | Kurihara | |
| 8,278,916 | B2 | 10/2012 | Sakai | |
| 9,140,617 | B2* | 9/2015 | Antoni | F16C 41/007 |
| 2003/0137381 | A1 | 7/2003 | Toyoda et al. | |
| 2004/0015307 | A1* | 1/2004 | Heisenberg | G01D 5/145 |
| | | | | 702/72 |
| 2004/0251896 | A1* | 12/2004 | Mizutani | G01D 5/142 |
| | | | | 324/207.25 |
| 2010/0060267 | A1* | 3/2010 | Wagner | G01D 5/145 |
| | | | | 324/207.2 |
| 2013/0335073 | A1 | 12/2013 | Deak et al. | |
| 2014/0320120 | A1* | 10/2014 | Klimenko | F24J 2/0455 |
| | | | | 324/207.25 |

FOREIGN PATENT DOCUMENTS

| | | |
|---|---|---|
| CN | 102032863 A | 4/2011 |
| CN | 102297652 A | 12/2011 |
| CN | 102353390 A | 2/2012 |
| CN | 203116756 U | 8/2013 |
| CN | 203203607 U | 9/2013 |
| CN | 203300354 U | 11/2013 |
| WO | WO-2014/108096 | 7/2014 |

OTHER PUBLICATIONS

International Application No. PCT/CN2014/070472, International Preliminary Report on Patentability mailed Jul. 14, 2015, (w/ English Translation), 18 pgs.

International Application No. PCT/CN2014/070472, Written Opinion mailed Apr. 25, 2014, (w/ English Translation), 16 pgs.

\* cited by examiner

MULTI-TURN ABSOLUTE MAGNETIC ENCODER

PRIORITY CLAIM TO RELATED APPLICATIONS

This application is a U.S. national stage application filed under 35 U.S.C. §371 from International Application Serial No. PCT/CN2014/070472, which was filed 10 Jan. 2014, and published as WO2014/108096 on 17 Jul. 2014, and which claims priority to Chinese Application No. 201310011438.5, filed 11 Jan. 2013, which applications and publication are incorporated by reference as if reproduced herein and made a part hereof in their entirety, and the benefit of priority of each of which is claimed herein.

TECHNICAL FIELD

The present invention relates to devices in the field of measurement technology, in particular, to a multi-turn absolute magnetic encoder device used to measure the absolute number of rotations of a shaft.

BACKGROUND

Magnetic encoder technology is used in areas such as motor speed control, robot position control, and various precision rotational measurement instruments. The absolute angular position and number of turns of a shaft are very important control parameters, and therefore the ability to achieve more accuracy while also counting the number of turns is highly desired.

Currently two types of absolute encoder technology are widely used, namely optical encoder technology and a magnetic encoder technology. Optical encoder technology is affected by bubbles, bright light, dirt, leakage and other factors that reduce measurement accuracy. Compared with optical encoder technology, magnetic encoder technology is not affected by these factors, and it has higher resolution, good stability, and can completely eliminate the faults inherent in photovoltaic technology. It is thus a good alternative.

Gear-based multi-turn encoder technology is simple and intuitive, and it has been widely used in multi-turn encoders. Here, the input shaft is connected to an output shaft using a reduction gear, and the speed of rotation of the output shaft is reduced by the reduction gear. This mechanism can be combined with magnetic sensors to measure the turns at each reduction level, and then converted into the number of turns of the input shaft. Assuming a reduction gear ratio of 10:1, 10 rotations of the input shaft yields one rotation of the output shaft. If rotating shafts are divided into 10 equal increments around their circumference, then the higher level shaft moves one increment for each rotation of the lower level shaft, and therefore an absolute position measurement and number of rotations of the input shaft can be obtained. Similarly, a second output shaft may be connected to the first output shaft though a reduction gear, and the second output shaft speed is further reduced. Again, assuming a gear ratio is 10:1 in the second reduction gear set, when the input shaft rotates 100 turns, the first gear shaft rotates 10 turns, and the second gear set rotates one turn. Relying on this mechanical reduction gear mechanism, one can calculate the total number of revolutions of the input shaft. Thus, the number of reduction gear stages directly determines the maximum number of turns of the input shaft that a multi-turn encoder can measure.

Additionally, magnetic absolute encoder technology measurement accuracy depends on the performance characteristics of the magnetoresistive angle sensors and the permanent magnet design. Compared with Hall sensors, magnetoresistive sensors such as tunneling magnetoresistive sensors have better magnetic field sensitivity, lower power consumption, and smaller size. A tunneling magnetoresistive angular displacement sensor may comprise two mutually orthogonal tunneling magnetoresistive sensors. The tunneling magnetoresistive angular displacement sensor produces two outputs from the magnetic field of the rotating permanent magnet, representing the sine and the cosine of the orientation angle $\phi$ of the magnetic field generated by the permanent magnet, and these components can be used to calculate the angle using the following relationships:

$$OUT1 = COS(\phi)$$

$$OUT2 = SIN(\phi)$$

The inverse tangent function can then be used to calculate the angle $\phi$ of the rotating magnetic field from the magnetoresistive angular displacement sensor outputs OUT1 and OUT2:

$$\phi = A\,TAN(OUT2/OUT1).$$

When the permanent magnet rotates by angle $\alpha$, the magnetic field produced by the permanent magnet passes through and is detected by the tunneling magnetoresistive sensors located a point defined by r and an angle. When the angle of the magnet $\alpha$ and the angle of the magnetic field $\phi$ form a linear relationship in the range of 0~360°, then the angle $\phi$ of the magnetic field detected by the tunneling magnetoresistive sensor represents the mechanical angle $\alpha$ of the permanent magnet, which represents the mechanical rotation angle of the shaft.

Thus, tunneling magnetoresistive angular displacement sensors will have special requirements for the design of the permanent magnet when applied to multiturn absolute magnetic encoders, but these sensors are better than those used in existing permanent magnet based multiturn absolute magnetic encoder s. Existing magnetic field sensor based absolute encoders have the following disadvantages and complications:

(1) The existing magnetic absolute encoder technology uses a Hall sensor as the magnetic field angle measurement devices, and they therefore have high power consumption and low resolution.

(2) Existing magnetic angle encoders using Hall sensors must detect the perpendicular magnetic field component perpendicular to the sensor surface generated by the permanent magnet, and tunneling magnetoresistive sensors detect the magnetic field component parallel to the surface of the sensor, so existing permanent magnet designs are not compatible with the tunneling magnetoresistive sensors.

(3) Existing permanent magnet based absolute encoders generally use a solid cylindrical permanent design, whereby the permanent magnet is fixed on the ends of the shafts, which increases space, while the cylindrical ring magnet design can be mounted directly on or into a counting wheel in order to make a more compact design.

SUMMARY OF THE INVENTION

The purpose of the present invention is to overcome the above drawbacks of the prior art, and this is accomplished through the use of tunneling magnetoresistive angle sensors, a suitable permanent magnet, and a multi-stage gear set, in order to provide a multiturn absolute magnetic encoder that can measure the absolute position and number of turns of a rotating shaft.

According to the invention there is provided a multi-turn absolute magnetic encoder comprising:

Firstly, it comprises M+1 counting units, where M is an integer of 1 or greater, a single-turn signal processing unit, and a multi-turn signal processing unit, Moreover, each counting unit comprises:

An encoder wheel with a coaxially fixed permanent magnet, and

A tunneling magnetoresistive angular displacement sensor, located in the detection plane of the permanent magnet, used to detect the magnetic field produced by permanent magnets and output a sensing signal, the permanent magnet has a cylindrical ring structure, comprising a first permanent magnet unit and a second permanent magnet unit, the first permanent magnet unit and a second permanent unit are located on opposites sides of a diametral the cross-section, and the permanent magnet diametral cross-section is defined by the outer diameter and the axial length of the permanent magnet.

The first permanent magnet unit's magnetization and said second permanent magnet's magnetization are polarized in a direction parallel to the rotation axis of the permanent magnet, but they are aligned in opposite directions, or, said first and second permanent magnet units have their magnetization directions aligned parallel to each other in a direction perpendicular to a diametral cross-section of the permanent magnet.

Within each counting unit, the tunneling magnetoresistive angular displacement sensor is located in the permanent magnet's detection plane.

The tunneling magnetoresistive angular displacement sensors are located within the detection plane of the permanent magnets at a certain radial distance from the rotation axis, in this particular radial region of the detection plane of the rotating permanent magnet the magnetic field component has an angle that varies linearly with the rotation angle of the permanent magnet, additionally.

The single-turn processing unit utilizes the signal from the first counting unit and outputs a coded signal, whereby the code represents the absolute position in one rotation of this wheel.

The multi-turn signal processing unit receives the signal from the second to the (M+1) counting units, in order to calculate the total number of rotations of the input shaft.

Preferably, the first counting unit is connected directly to the input shaft.

Preferably, the second through M counting units, each comprises a reduction gear set, wherein the output shaft of the reduction gear set serves as the input shaft of the next reduction gear set, and the counting wheel is fixed to the output shaft; each counting unit is connected to a signal processing unit that computes and outputs the number of rotations of the counting unit input shaft of the reduction gear set using the signals from the counting unit's tunneling magnetoresistive angular displacement sensors.

Preferably, M is in the range of 1 to 10.

Preferably, counting unit m rotates with respect counting unit m+1 with a turns ration of N:1, where m is an integer in the range of 1 to M, and N is an integer greater than 1.

Preferably, counting unit m rotates with respect to counting unit m+1 with a turns ratio of 10:1.

Preferably, the outer diameter of the cylindrical permanent magnet ring structure is 3-200 mm, the inner diameter of the cylindrical permanent magnet ring structure is 1-100 mm, and the axial length of the columnar structure of the cylindrical ring permanent magnet is 1-50 mm.

Preferably, the tunneling magnetoresistive angular displacement sensor comprises two mutually orthogonal single-axis angular displacement sensors or a two-axis Wheatstone bridge angular displacement sensor, wherein the sensing axes are rotated by 90 degrees with respect to each other.

Preferably, the circular end faces of the cylindrical ring permanent magnets are positioned parallel to a detection plane.

Preferably, the distance between the detection plane and the circular end face of the cylindrical ring permanent magnet is in the range of 1-5 mm.

Preferably, the magnetization of the first permanent magnet unit and the second permanent magnet unit are the same size.

Preferably, the permanent magnet is composed one or more of the following materials categories including $RECo_5$, where RE=Sm and/or Pr; $RE_2TM_{17}$, where RE=Sm, TM=Fe, Cu, Co, Zr and/or Hf; and $RE_2TM_{14}B$, where RE=Nd, Pr, and/or Dy, TM=Fe and/or Co; FeCrCo alloy; an alloy containing NbFeB, or the permanent magnet (100, 300) is comprised of permanent magnet powder embedded in plastic, rubber, or a resin composite.

The present invention has the following beneficial effects:

1) The invention adopts the reduction gear set to reduce the input speed at each level of the absolute position encoder, which is simple and intuitive, and yields high precision.

2) The invention can simultaneously measure the absolute angle of the input shaft as well as the total number of rotations.

3) The invention utilizes tunneling magnetoresistive angular displacement sensors, which have high sensitivity, extremely low power consumption, small size, and position measurement accuracy that is not affected by environmental conditions such as dust, oil, or the like.

4) The cylindrical ring permanent magnet structure is simple and can be embedded directly into existing counting wheel structures, at each reduction gear level, saving space.

5) the cylindrical ring permanent magnets used in the present invention produce a magnetic orientation angle in the detection plane that is linearly related to the mechanical rotation angle of the permanent magnet, as required when using magnetoresistive sensors to detect the magnetic field orientation.

6) the cylindrical ring permanent magnets used in the present invention allow the distance from the end face of the permanent magnet to the detection plane within a specific area of the detection plane to vary over a wide range, so that the performance of the tunneling magnetoresistive sensor is less sensitive to the precise position of the sensor.

DESCRIPTION OF THE PREFERRED EMBODIMENTS

The figures and specific examples provided below will be used to describe detailed embodiments of the present invention.

Example 1

Figure 1:
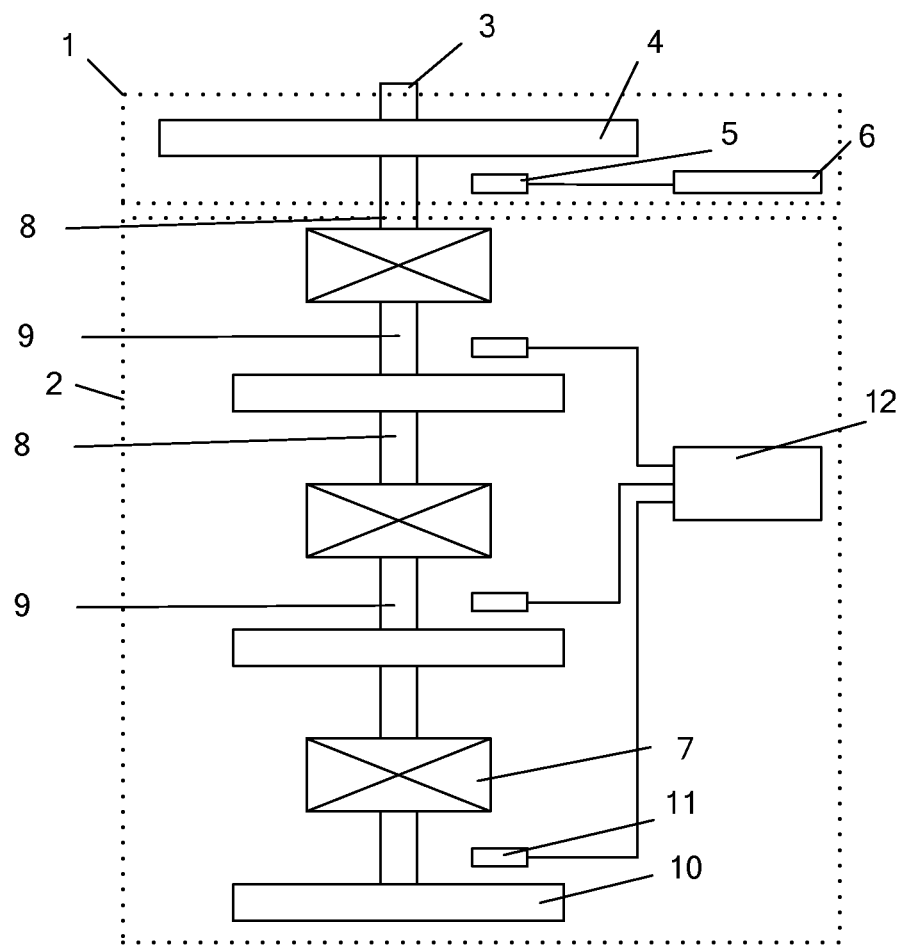
FIG. 1 is a schematic drawing of a magnetic multi-turn absolute angle encoder.

FIG. 1 is a schematic drawing of a multi-turn absolute magnetic encoder of the present invention, containing a single turn counting unit 1 and a multi-turn counting unit 2, an input shaft 3, suitable for measuring the absolute position and number of turns for the rotating object under test. Single-turn counting unit 1 comprises a permanent magnet fixed to the counting wheel 4 (also called a permanent magnet counting wheel), a tunneling magnetoresistive angular displacement sensor 5, and a single-turn signal processing unit 6, the counting wheel 4 is mounted directly on the input shaft 3. The tunneling magnetoresistive angular displacement sensor 5 is used to measure the absolute position of the counting wheel 4 by detecting the angle of the rotating permanent magnet, and the measured result is the absolute position of the input shaft 3.

Multi-turn counting unit 2 comprises M reduction gear stages 7 used to scale down the rotation speed of the input shaft, where M is an integer of 1. Each reduction gear stage has a corresponding input shaft 8, an output shaft 9, a permanent magnet coaxially fixed to the counting wheel 10, and a tunneling magnetoresistive angular displacement sensor 11. Multiturn counting unit 2 further includes a multi-turn signal processing unit 12 and multi-turn unit connected to each tunneling magnetoresistive angular displacement sensor in order to the sense and calculate the total number or rotations of shaft 3 tunneling magnetoresistive angular displacement sensor using the signals from the tunneling magnetoresistive angular displacement sensors. The reduction gear set of each stage 8 has a gear ratio of N:1, which is transmitted to the output shaft 9, and repeated for M stages of the M+1 counting wheels, such that each successive counting wheel stage has it number of revolutions reduced by the ratio of N:1, where N is an integer greater than 1. Preferably, N equals 10. Each level has a reduction gear set connecting its input shaft to the preceding level's output shaft. A permanent magnet is installed in the counting wheel 10 of each output shaft 9 such that it rotates with the output shaft. Tunneling magnetoresistive angular displacement sensor 11 measures the revolutions of the permanent magnet counting wheel 10 and the sensor signals are fed to the multi-turn signal processing unit 12. The multiturn signal processing unit to converts the measured sensor signal to the absolute rotational position of the corresponding counting wheel and thus the input shaft turns. Due to the reduction gear ratio, the output shaft 9 rotates once for every N turns of input shaft 8, the angular conversion relationship between turns and absolute position is thus $T1=(\alpha/360)*N$. When the M level input shaft 8 rotates N turns, the permanent magnet counting wheel 10 located on the output shaft cannot meet the requirement for counting more rotations, then more counting levels and associated reduction gear sets need to be added to fulfill the requirements. The approach is similar to carrying a digit in the next higher level, when the M counting wheel set rotates N turns, a digit must be added to the M+1 counting unit, when the M+1 counting unit rotates N turns, a digit must be added to the M+2 counting unit, and so on. The maximum number of turns that can be counted is therefore determined by the number of counting units, the transmission ratio N or base of the counting system N, where the reduction gear sets M represent the number of digits, where each M reduction gear set counts the number of rotations of the first M levels. Thus utilizing the signals from the tunneling magnetoresistive angular displacement sensors, we can generate a number in base N, where a value of 10 is used for a decimal system, with up to M digits to record rotations of the input shaft 3. For example, if N=10, and the absolute position of the first counting unit is 3 and the absolute position of the second counting unit is 2, this corresponds to 23 revolutions of the input shaft.

Example 2

Figure 2:
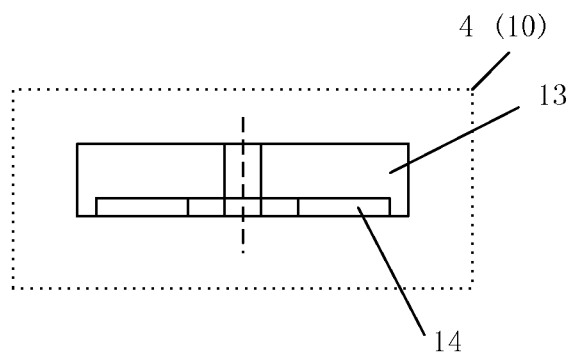
FIG. 2 is a cross-sectional view of a magnetic multi-turn absolute angle encoder counting wheel.
Figure 3:
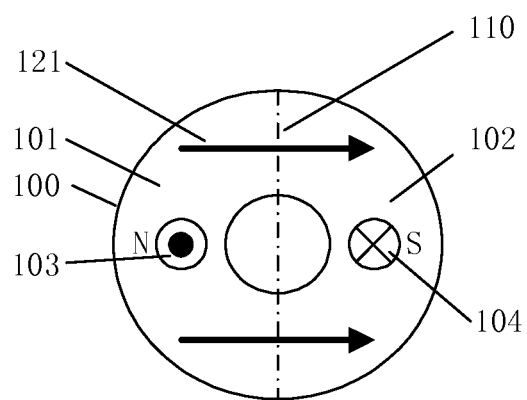
FIG. 3 is a top view of the cylindrical ring permanent magnet with the magnetizations aligned perpendicular to the end faces.
Figure 4:
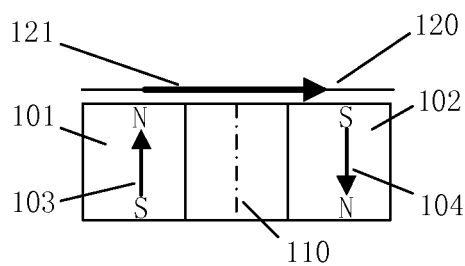
FIG. 4 is a cross-sectional view of the perpendicularly magnetized cylindrical ring permanent magnet.

FIG. 2 is a schematic cross-sectional view of counting units 4 and 10. Counting units 4, 10 include a cylindrical ring permanent magnet 14 that is mounted on the non-magnetic counting wheel 13. The cylindrical ring permanent magnet 14 may have two permanent magnet subunits 100 and 300. FIGS. 3 and 4 below describe permanent magnet 100 and FIGS. 5 and 6 below describe permanent magnet 300.

FIGS. 3 and 4 show schematic drawings of an embodiment of the permanent magnet 100 according to a preferred implementation of the present invention. The permanent magnet 100 has cylindrical ring geometry, and it is comprised of a permanent unit 101 and a permanent magnet unit 102, wherein permanent magnet unit 101 and permanent magnet unit 102 are symmetrically arranged about diametral cross-section 110. The magnetization directions 103 and 104 of permanent magnet units 101 and 102 are oriented in antiparallel directions along the axis. Preferably, the magnetization 103 of the permanent magnet unit 101 and the magnetization 104 of permanent magnet unit 102 have the same magnitude.

Those skilled in the art can design the permanent magnet 100 into any desired size. Preferably, the permanent magnet 100 is a cylindrical ring with inner diameter 1-100 mm, outer diameter of 3-200 mm, and has an axial length of 1-50 mm.

The detection plane 120 or permanent magnet 100 is located adjacent and parallel to the end face or permanent magnet 100. Preferably, the detection plane 120 is separated from the end surface of the cylindrical ring by a distance of 1-5 mm. In this patent, the permanent magnet 100 produces a magnetic field component 121 in the detection plane 120. Herein, the portion of the detection plane 120 corresponding to the particular detector region 122 located within a certain radial distance from the axis, in particular the magnetic field components 121 within this detection area will have an angle that varies linearly with respect to the angle of the permanent magnet 100, which will be specifically described hereinafter.

Preferably, the composition of the permanent magnet material 100 is Alnico. Alternatively, the composition of the permanent magnet 100 is a ferrite ceramic material such as $MO \cdot 6Fe_2O_3$, M is Ba, Sr or combinations of both. Alternatively, the composition of the permanent magnet 100 is $RECo_5$, RE=Sm and/or Pr; $RE_2TM_{17}$, RE=Sm, TM=Fe, Cu, Co, Zr and/or Hf; or $RE_2TM_{14}B$, RE=Nd, Pr, and/or Dy, TM=Fe and/or Co. Alternatively, the permanent magnet material 100 composed of an alloy of NbFeB or FeCrCo. Alternatively, the permanent magnet 100 is composed of the permanent magnet powder embedded in plastic, rubber, or resin composite.

Figure 5:
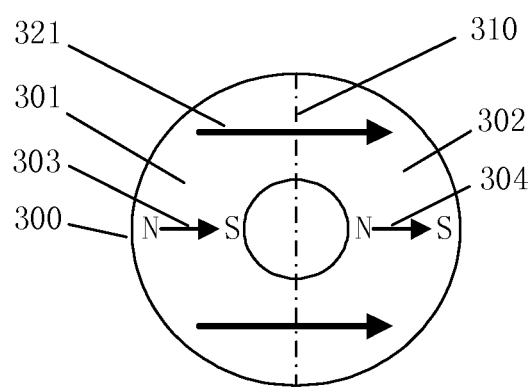
FIG. 5 is a top view of the cylindrical ring permanent magnet with the magnetizations aligned parallel to the end faces.
Figure 6:
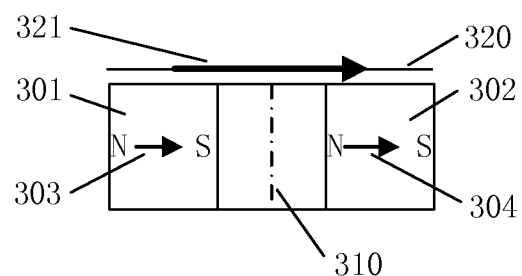
FIG. 6 is a cross-sectional view of the parallel magnetized cylindrical ring permanent magnet.

FIGS. 5 and 6 show schematic drawings of another embodiment of the permanent magnet 300 of the present invention. The permanent magnet 300 has cylindrical ring geometry, and it is comprised of a permanent unit 301 and a permanent magnet unit 302, wherein permanent magnet unit 301 and permanent magnet unit 302 are symmetrically arranged about diametral cross-section 310. The magnetization directions 303 and 304 of permanent magnet units 301 and 302 are oriented along a diameter in the same direction. Preferably, the magnetization 303 of the permanent magnet unit 301 and the magnetization 304 of permanent magnet unit 302 have the same magnitude.

Those skilled in the art can design the permanent magnet 300 into any desired size. Preferably, the permanent magnet 300 is a cylindrical ring with inner diameter 1-100 mm, outer diameter of 3-200 mm, and has an axial length of 1-50 mm.

The detection plane 320 is located in front of and parallel to the end face or permanent magnet 300. Preferably, the detection plane 320 is separated from the end surface of the cylindrical ring by a distance of 1-5 mm. In this patent, the permanent magnet 300 produces a magnetic field component 321 along the detection plane 320. Herein, the detection plane 320 corresponding to the particular detector region 322 located within the cylindrical ring from the axial region specific radius, in particular the magnetic field components 321 within the detection area will have an angle that varies linearly with respect to the angle of the permanent magnet 300, which will be specifically described hereinafter.

Preferably, the composition of the permanent magnet material 300 is Alnico. Alternatively, the permanent magnet 300 is a ferrite ceramic material such as $MO \cdot 6Fe_2O_3$, M is Ba, Sr or combinations of both. Alternatively, the composition of the permanent magnet 100 is $RECo_5$, RE=Sm and/or Pr; $RE_2TM_{17}$, RE=Sm, TM=Fe, Cu, Co, Zr and/or Hf; or $RE_2TM_{14}B$, RE=Nd, Pr, and/or Dy, TM=Fe and/or Co. Alternatively, the permanent magnet material 100 composed of an alloy of NbFeB or FeCrCo. Alternatively, the permanent magnet 300 is composed of the permanent magnet powder embedded in plastic, rubber, or resin composite.

Example 3

Example 3 of the present invention shows the relative distance between the permanent magnets 100, 300 and the tunneling magnetoresistive angular displacement sensors 5, 11. Tunneling magnetoresistance sensors are located in the detection plane adjacent to the permanent magnet, for sensing the magnetic field from the permanent magnet and outputting a signal. The tunneling magnetoresistive sensors are disposed at a certain radial distance from the rotation axis within the detection plane of the permanent magnets, in this particular radial region of the detection plane of the rotating permanent magnet the magnetic field components have an angle φ that varies linearly with the rotation angle α of said permanent magnet.

Figure 7:
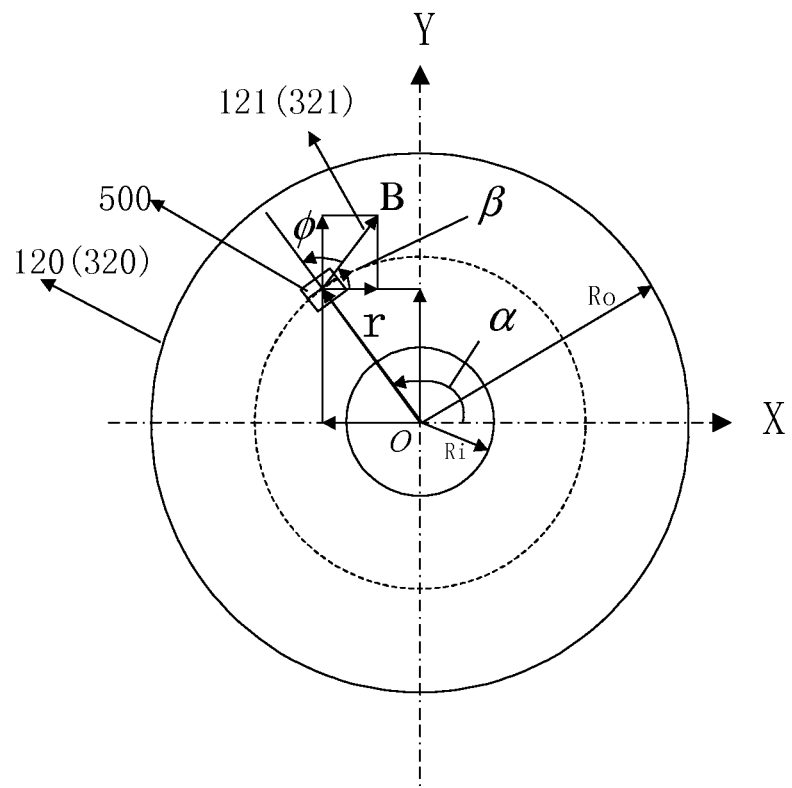
FIG. 7 shows the relative position of a tunneling magnetoresistive sensor with respect to the permanent magnet of the present invention.
Figure 8:
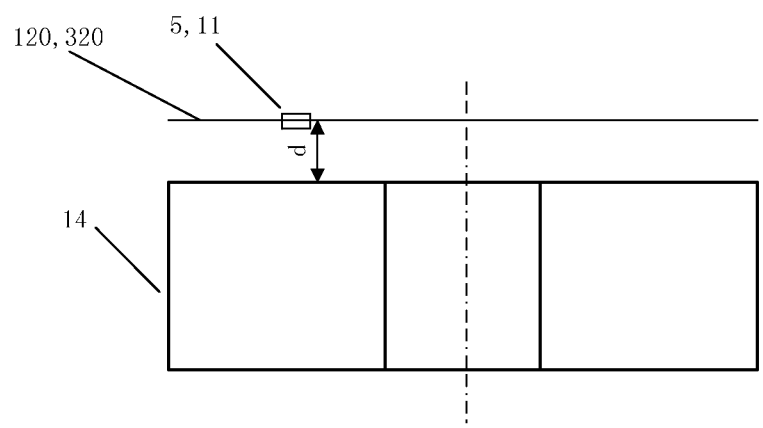
FIG. 8 shows a side cross-sectional view of the relative position of a tunneling magnetoresistive sensor with respect to the permanent magnet of the present invention.

FIGS. 7 and 8 are top and side views of the present invention, showing the detection plane of the permanent magnet 14 and the tunneling magnetoresistive angular displacement sensor 5, 11, at a distance d from the end face 120, 320 of the permanent magnet. Here the permanent magnet detection plane origin is the center of of an XY coordinate system, as shown in FIG. 7. The cylindrical ring permanent magnet 14 has inner radius $R_i$, outer radius $R_o$, and thickness t; A tunneling magnetoresistive sensor 5, 11 detects the direction of the vector magnetic field at a point r(x, y), in the plane with respect to X-axis, and this direction is defined by angle α. It is assumed that the magnetic field components at r are denoted Bxy (Bx, By) and define rotation angle β. The relationship necessary to calculate the angles α and β are as follows:

$$\alpha = a\tan(y/x) \ (x>0)$$

$$\alpha = a\tan(y/x) + \pi \ (x<0, y>0)$$

$$\alpha = a\tan(y/x) - \pi, \ (x<0, y>0)$$

$$\beta = a\tan(By/Bx) \ (Bx>0)$$

$$\beta = a\tan(By/Bx) + \pi \ (Bx<0, By>0)$$

$$\beta = a\tan(By/Bx) - \pi \ (Bx<0, By<0),$$

with α and β in the range of (−180°, 180°).

Tunneling magnetoresistive angular displacement sensor 5 or 11 detects the magnetic field Bxy in order to determine angle $\phi = \beta - \alpha$.

In normal operation of the magnetic encoder, the angle the tunneling magnetoresistive sensor 5, 11 remains fixed, while the permanent magnets 14 rotate about the axis of rotation, the axis is the origin of the measurement plane, r is the radius from the origin to the tunneling magnetoresistive angular displacement sensor 5, 11, the rotating magnet generates a rotating magnetic field the phase and amplitude of which are measured by a tunneling magnetoresistive angular displacement sensor 5, 11. This is equivalent to the permanent magnets 14 remaining fixed, and the tunneling magnetoresistive sensor 5, 11 rotated around the circumference to measure the magnetic fields. In this case, the permanent magnet's angle is α, and the angle of the rotating magnetic field is φ.

Example 4

Figure 9:
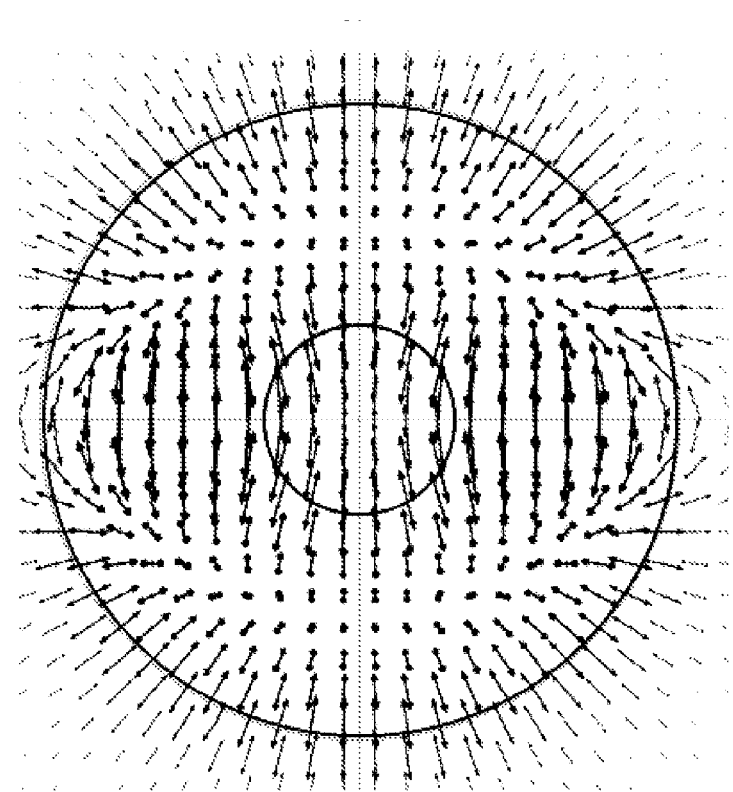
FIG. 9 shows the vector magnetic field distribution in the detection plane of the perpendicularly magnetized cylindrical ring permanent magnet.
Figure 10:
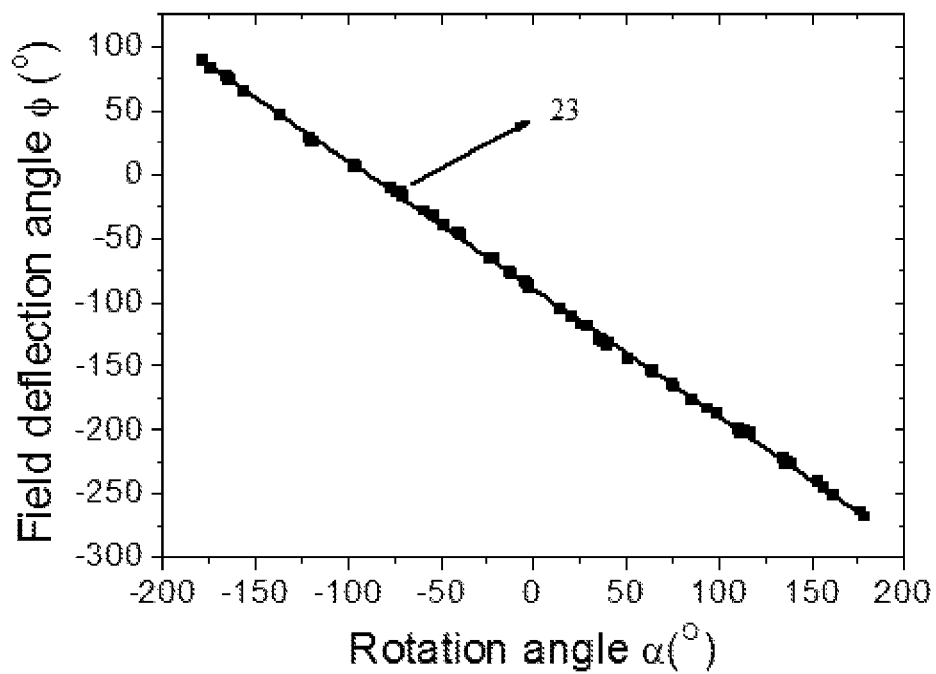
FIG. 10 shows the linear relationship between the magnetic angle φ detected in the detection plane and the rotational angle α permanent magnet for the rotating perpendicularly magnetized cylindrical ring permanent magnet.
Figure 11:
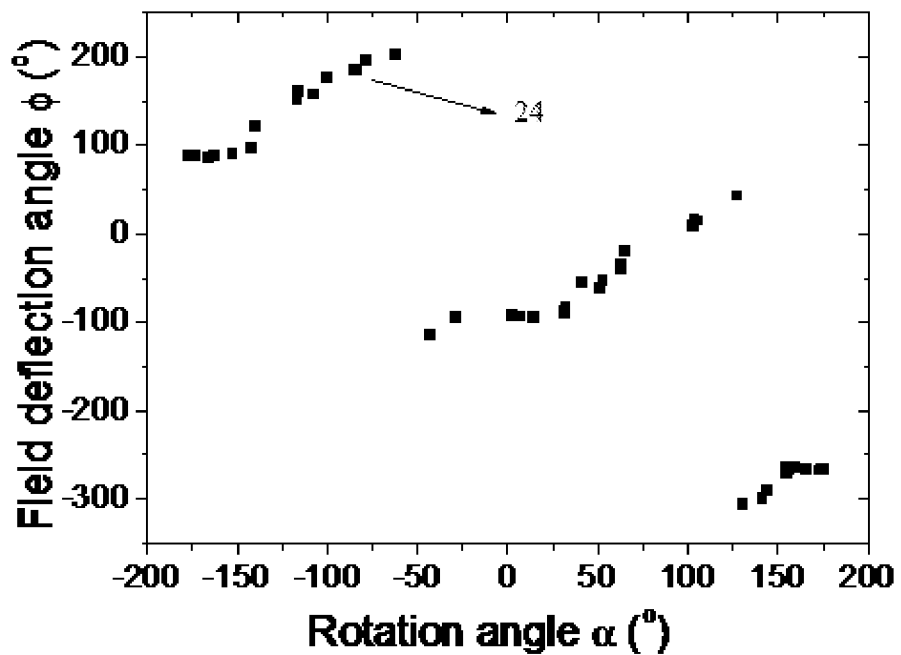
FIG. 11 shows a case with non-linear relationship between the magnetic angle φ detected in the detection plane and the rotational angle α for the rotating perpendicularly magnetized cylindrical ring permanent magnet.
Figure 12:
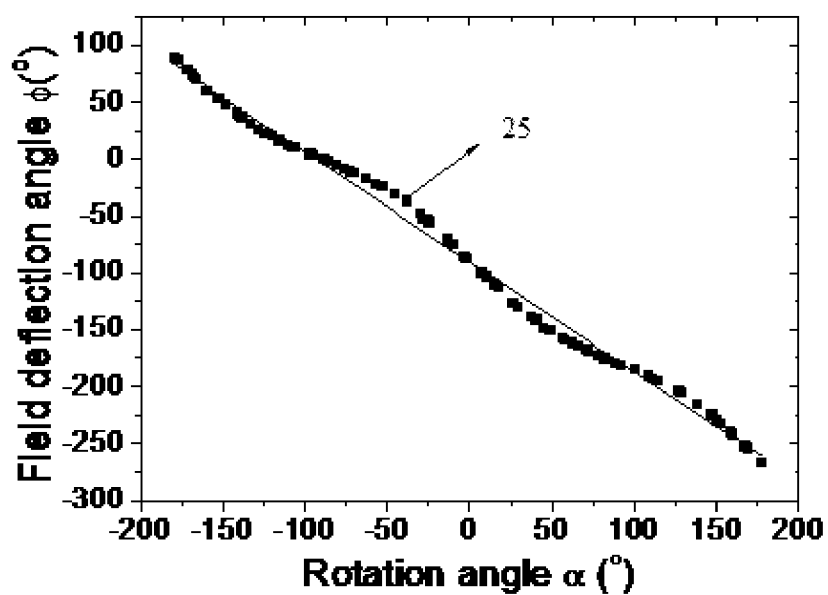
FIG. 12 shows another case with non-linear relationship between the magnetic angle φ detected in the detection plane and the rotational angle α permanent magnet for the for the rotating perpendicularly magnetized cylindrical ring permanent magnet.
Figure 13:
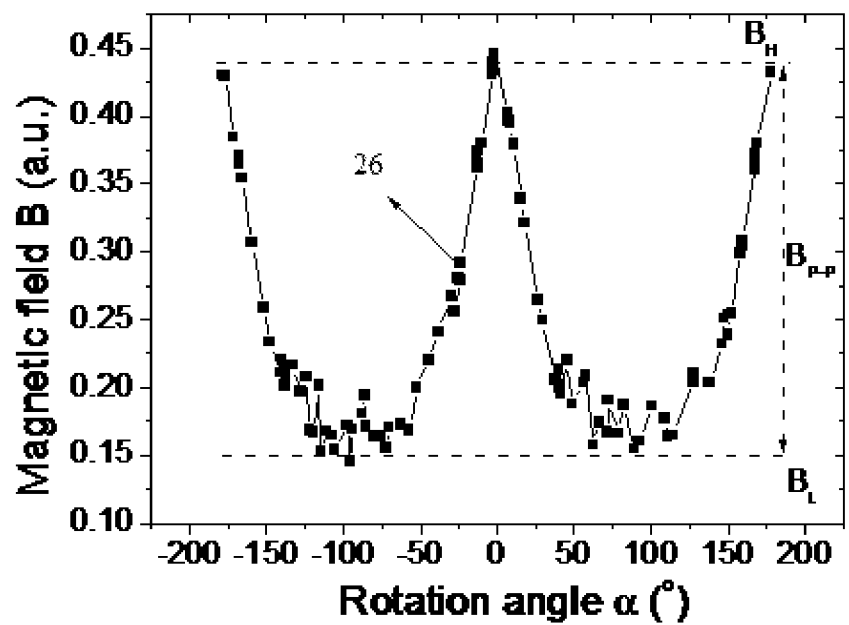
FIG. 13 shows the Bxy magnetic field magnitude at the detection plane as a function of permanent magnet rotation phase angle α for the rotating perpendicularly magnetized cylindrical ring permanent magnet.

FIG. 9 shows the magnetic field vector distribution in the detection plane 120 for permanent magnet 100. In this detection plane 120, the two-dimensional magnetic field Bxy is calculated, here, r can be varied within the range (0, $R_o$) and the relationship between the phase angle φ of the magnetic field and the phase angle relationship α of the rotating permanent magnet can be obtained; the relationship between the angles can be linear or non-linear. For example, FIG. 10 shows the curve 23 of the rotating magnetic field of the permanent magnet and illustrates that the angle φ of the magnetic field can be a linear function of α, whereas FIG. 11 shows the curve 24 for the rotating magnetic field of the permanent magnet illustrates a case where the angle φ depends non-linearly and discontinuously on angle α. Also, as shown in FIG. 12 the curve 25 representing the relationship between the permanent magnet angle α and the magnetic angle φ may have varying degrees of nonlinearity with or without discontinuity. FIG. 13 is a plot illustrating the dependence of the magnitude of Bxy as a function of rotation angle α, which is denoted as curve 26. The magnitude of the rotating magnetic field has W-shaped angular variation, with maximum and minimum values corresponding to BH and BL. For a magnetoresistive angular displacement sensor, it is preferred to have the variation in the magnetic field amplitude be as small as possible, in order to guarantee sensor signal accuracy.

A linear fit may be applied to the φ and a curves shown in FIGS. 10, 11, 12 in order to calculate the $R^2$ fitting parameter, where $R^2$ indicates stronger linear behavior as it approaches a value of 1.

The degree of variation in the magnitude of B 26 can be characterized using the following relationship:

$$NORMALIZED\_B = B_{pp}/B_L = (B_H - B_L)/B_L$$

Here smaller values of NORMALIZED_B indicate smaller magnetic field variation.

To determine the degree of nonlinearity between the magnetic field angle φ and the rotating magnetic field α in the detection plane, a curve fit be performed on the φ versus α curves at various values of r between (0, Ro), and additionally magnetic field variation as a function a that is NORMALIZED_B can be plotted in the same way.

Figure 14:
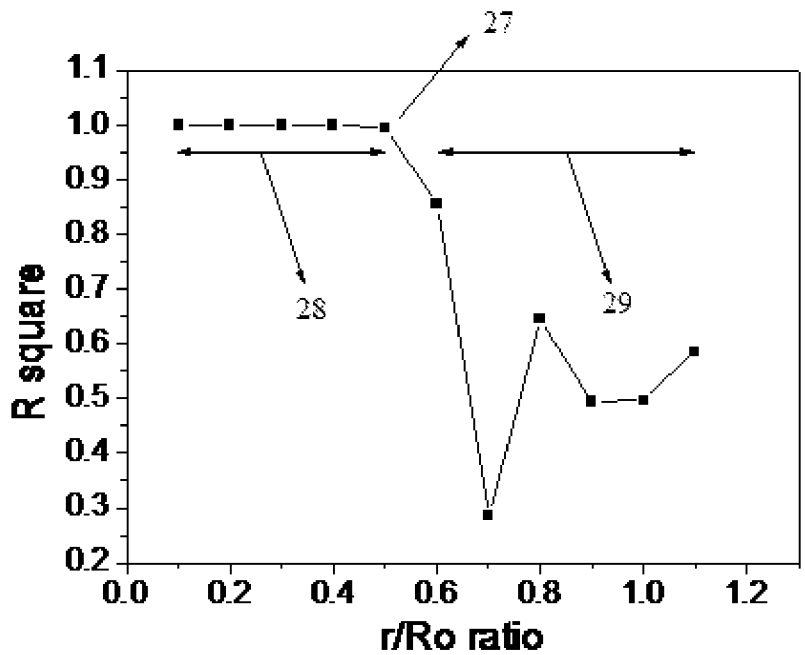
FIG. 14 shows the fit parameter $R^2$ for the linear fit to the magnetic angle φ detected in the detection plane and the rotational angle α permanent magnet for the rotating perpendicularly magnetized cylindrical ring permanent magnet as a function of the relative position of the tunneling magnetoresistive sensor from the rotation axis, $r/R_o$.

FIG. 14 shows linear fit parameter $R^2$ plotted as a function of $r/R_o$. As can be seen from the curve 27, there is a region 28 with value is close to 1, indicating that in this region the angle φ of rotating magnetic field and the angle φ of the permanent magnet have near-linear relationship. As can be easily observed area 28 of the detection plane is a region that is well suited for the tunneling magnetoresistive sensor 5, 11, but region the region 29 is not well suited for the tunneling magnetoresistive sensor 5, 11.

Figure 15:
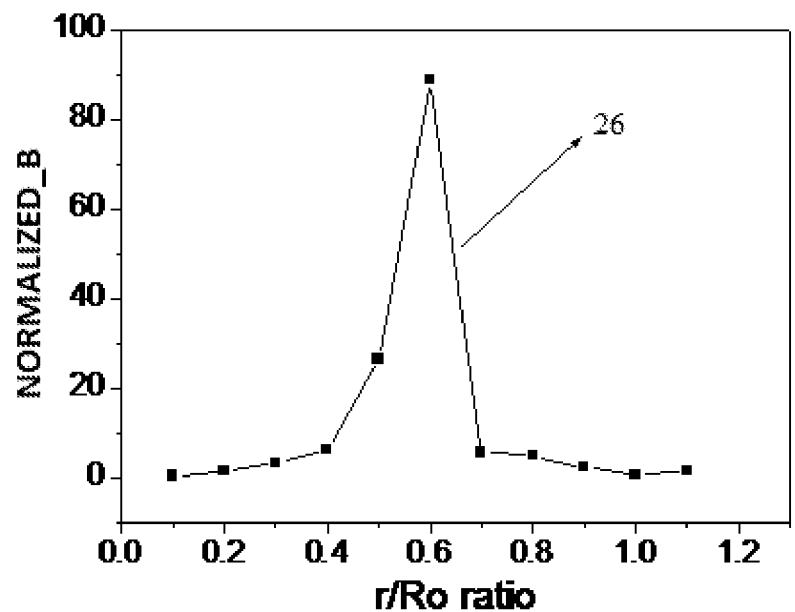
FIG. 15 shows the normalized magnetic field component detected by the tunneling magnetoresistive sensor as a function of relative distance $r/R_o$ from the rotation axis of the perpendicularly magnetized permanent magnet.
Figure 16:
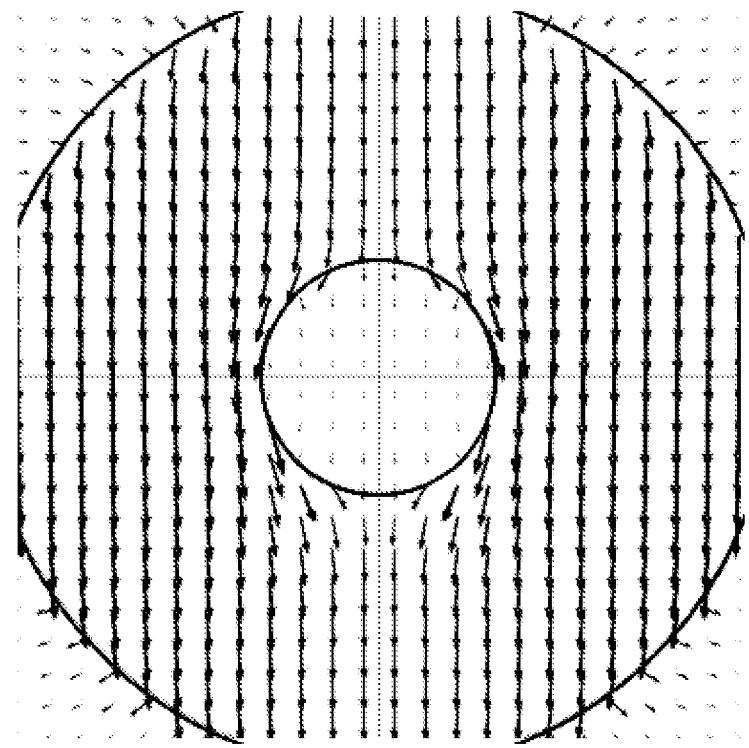
FIG. 16 shows the vector magnetic field distribution in the detection plane of the parallel magnetized cylindrical ring permanent magnet.

FIG. 15 shows a curve NORMALIZED_B as a function of the relative position $r/R_o$ of the tunneling magnetoresistive angular displacement sensor 5, 11 within the detection plane. As can be seen from the curve 30 for a portion of region 28 the magnetic field variation for the tunneling magnetoresistive sensor 5, 11 is sufficiently small for good performance to be obtained.

Example 5

Figure 17:
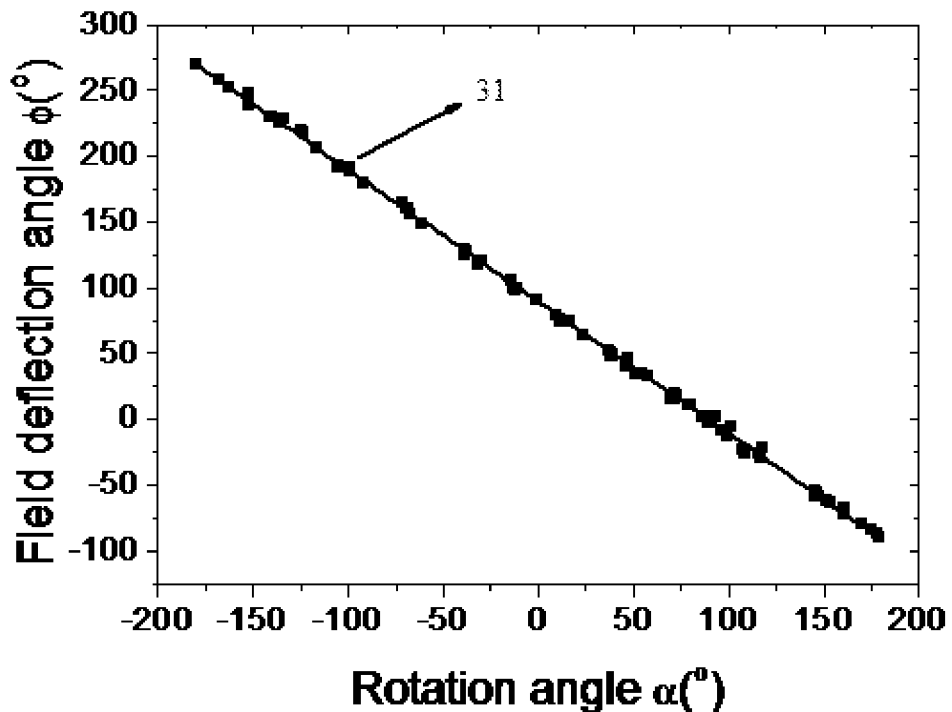
FIG. 17 shows the linear relationship between the magnetic angle φ detected in the detection plane and the rotational angle α permanent magnet for the rotating parallel magnetized cylindrical ring permanent magnet.
Figure 18:
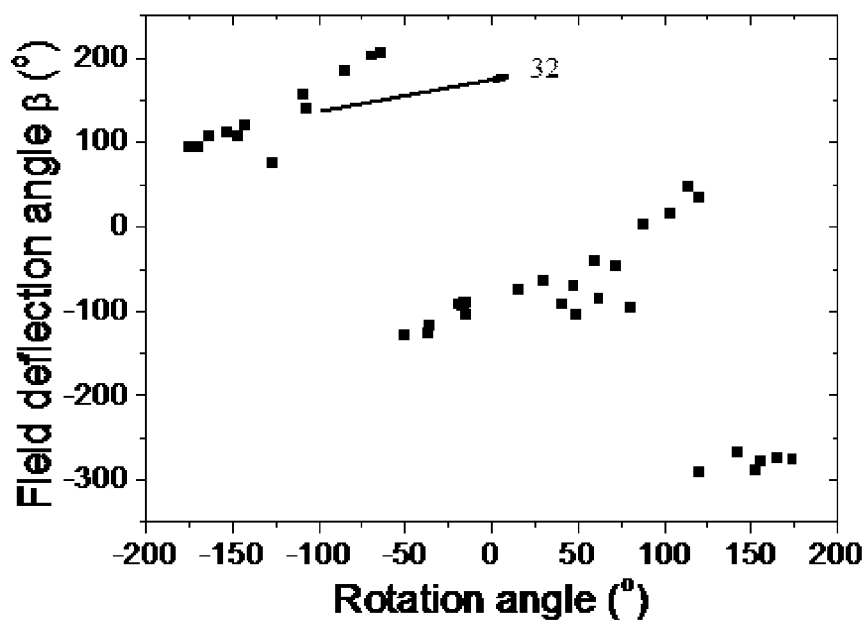
FIG. 18 shows a case with non-linear relationship between the magnetic angle φ detected in the detection plane and the rotational angle α for the rotating parallel magnetized cylindrical ring permanent magnet.
Figure 19:
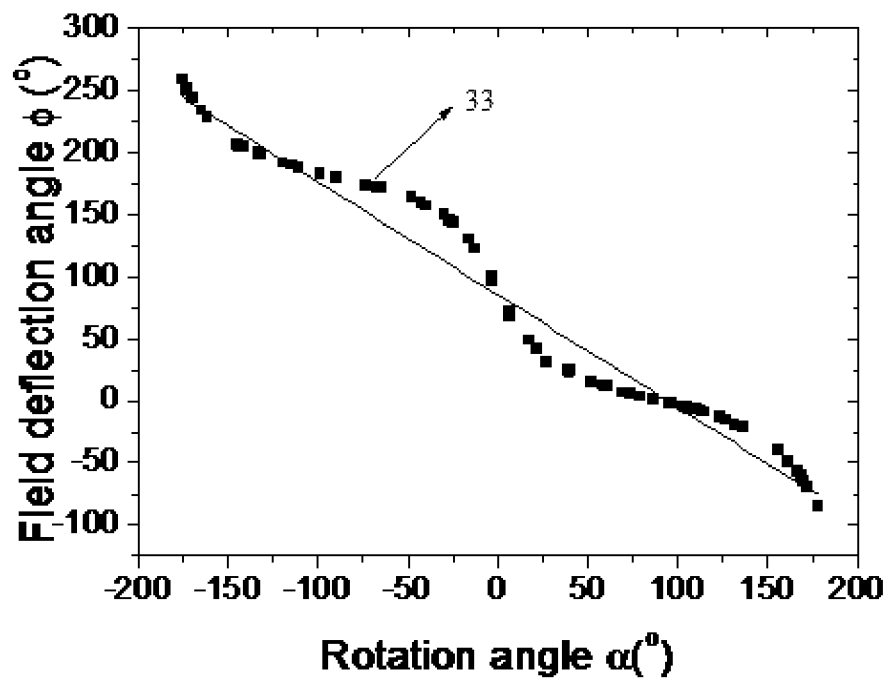
FIG. 19 shows another case with non-linear relationship between the magnetic angle φ detected in the detection plane and the rotational angle α permanent magnet for the for the rotating parallel magnetized cylindrical ring permanent magnet.

FIG. 14 shows the magnetic field vector distribution in the detection plane 320 for permanent magnet 300. In this detection plane 320, the two-dimensional magnetic field Bxy is calculated. As shown in FIGS. 17, 18, 19 within the detection plane 320 angle φ of the rotating magnetic field and angle α of the permanent magnet may have a linear relationship as in curve 31, a non-linear discontinuous relationship as shown in curve 32, and intermediate degrees of linearity as shown in curve 33. The behavior of curve 26 indicates a linear relationship between the rotating magnetic field angle φ and angle α of the permanent magnets of the in the detection plane 320, such that the angle of the permanent magnets can be determined usefully for application as a magnetic encoder.

Figure 20:
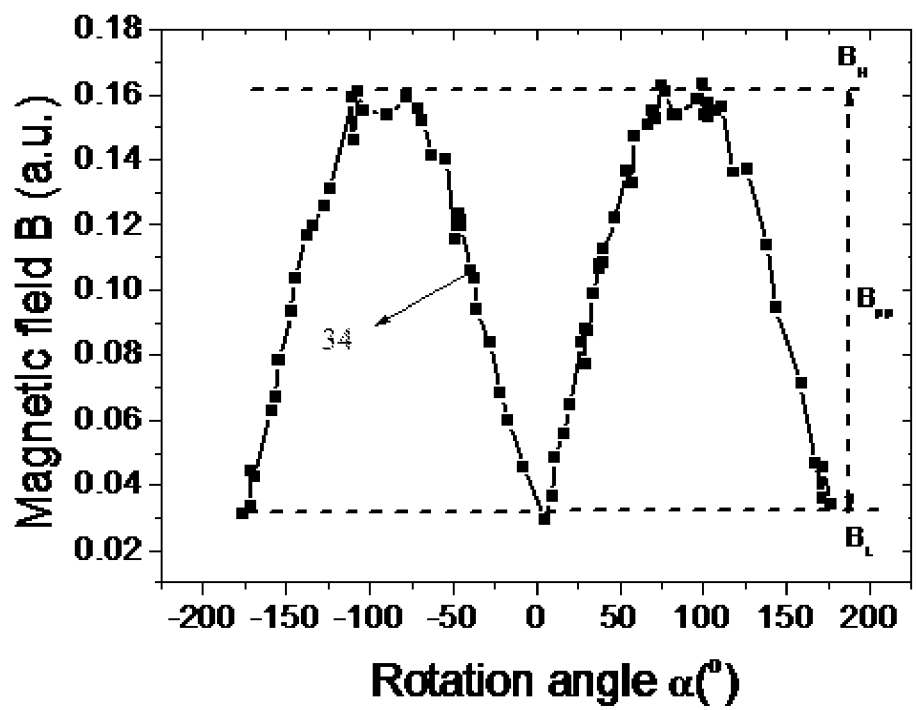
FIG. 20 shows the Bxy magnetic field magnitude at the detection plane as a function of permanent magnet rotation phase angle α for the rotating parallel magnetized cylindrical ring permanent magnet.

FIG. 20 shows the magnitude variation of the rotating magnetic field Bxy as a function of the permanent magnet rotation angle α. It can be seen from this curve 34, that the rotating magnetic field Bxy has an M-shaped periodic variation as a function of the permanent magnet's angle α.

Figure 21:
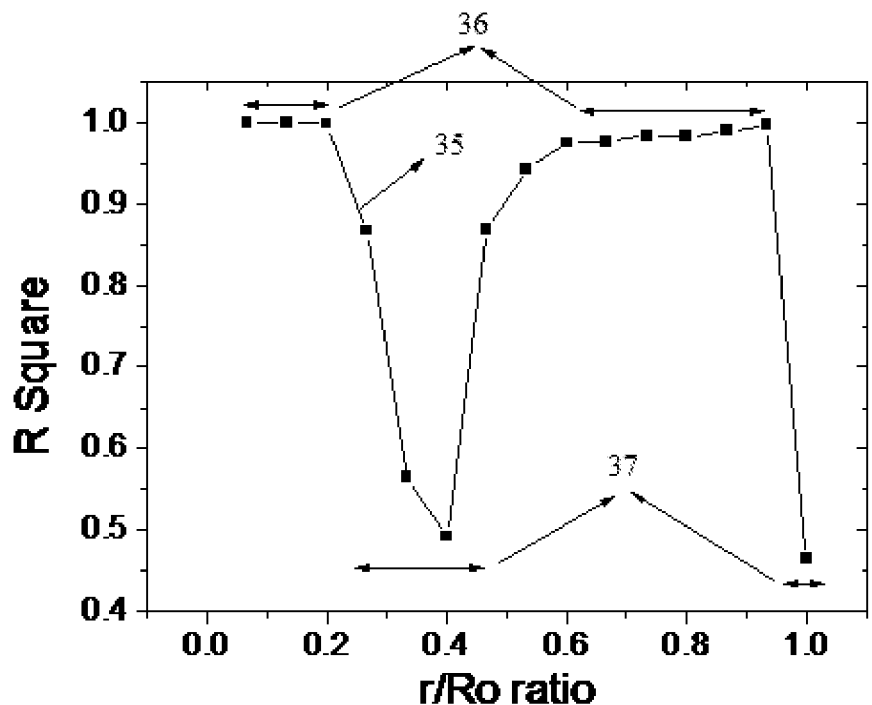
FIG. 21 shows the fit parameter $R^2$ for the linear fit to the magnetic angle φ detected in the detection plane and the rotational angle α permanent magnet for the rotating parallel magnetized cylindrical ring permanent magnet as a function of the relative position of the tunneling magnetoresistive sensor from the rotation axis, $r/R_o$.
Figure 22:
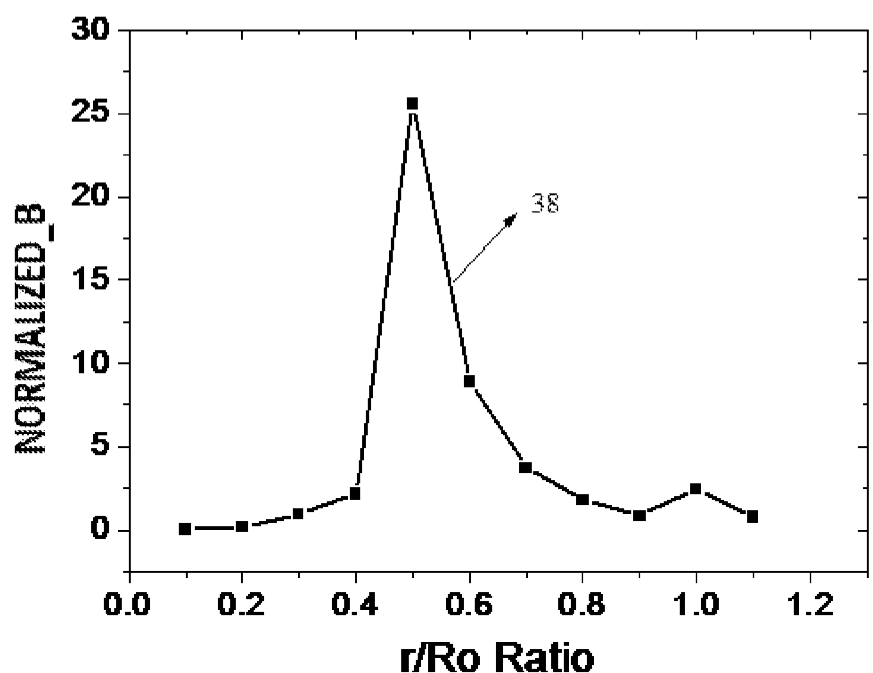
FIG. 22 shows the normalized magnetic field component detected by the tunneling magnetoresistive sensor as a function of relative distance $r/R_o$ from the rotation axis of the parallel magnetized permanent magnet.

Similarly, in order to determine the range of linear area within the test surface 22, the φ-α curve fitting parameters can be obtained at different relative positions $r/R_o$, as shown in FIG. 21 the $R^2$ fit parameter which indicates linearity, is plotted as curve 35, the portion 36 of the detection plane 22 is best suited for a tunneling magnetoresistive sensor 5,11, whereas region 37 is not well suited for a tunneling magnetoresistive sensor 5, 11. Further, it can be seen from FIG. 22, which shows NORMALIZED_B as a function of the relative position $r/R_o$ of the tunneling magnetoresistive sensor 5, 11 identified as curve 33 coincides with region 38 is small compared to region 37 which is the non-ideal operating area.

The above examples 3, 4, and 5 shows that permanent magnet 14, has a detection plane, in which there is a specific detection zone 28 and 36, suitable for using a tunneling magnetoresistive sensor to measure the angle φ of the rotating magnetic field of a permanent magnet. In these regions, there is a linear relationship with permanent magnet angle α, and the variation of the magnetic field magnitude is small enough to meet the requirements of the sensor. Thus, the rotation angle of the magnetic field measured by a tunneling magnetoresistive sensor can be converted into the rotation angle of the permanent magnet by the digital processing circuit in order to calculate and output a code representing the rotational angle of the permanent magnet, suitable for use in magnetic angle encoders.

Example 6

Figure 23:
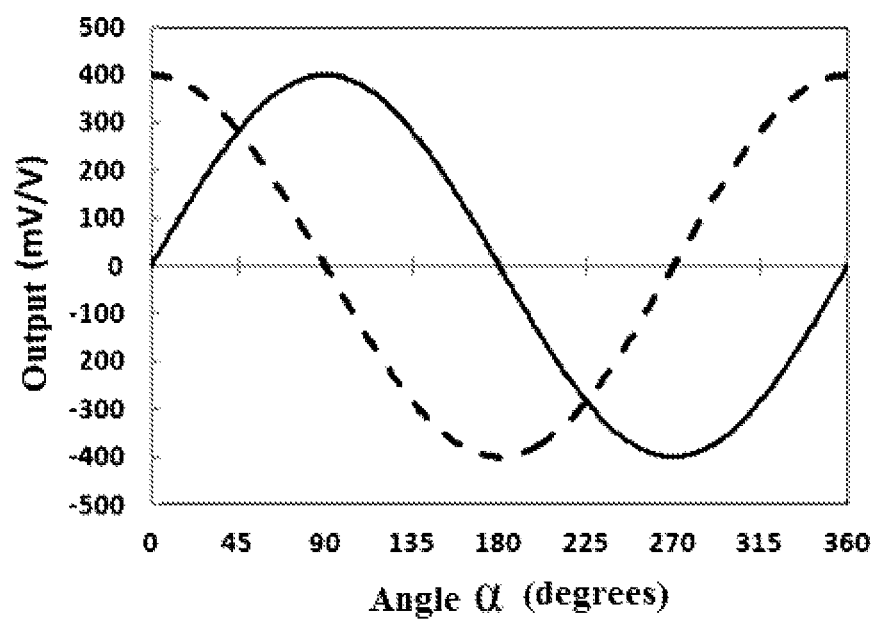
FIG. 23 shows the output signals of a tunneling magnetoresistive angular displacement sensor mounted within an angle encoder during a rotation of the cylindrical ring permanent magnet.

Tunneling magnetoresistive angular displacement sensor 5, 11 is formed from two orthogonal uniaxial full-bridge tunneling magnetoresistive angular displacement sensors, or two half bridges combined to form a full bridge, wherein the corresponding two half-bridge sensors have opposite sensing polarity. When an external magnetic field is applied to a uniaxial tunneling magnetoresistive angular displacement sensor at angle of φ to sensing axis, then it is also applied at an angle of π/2-φ to the sensing axis of the other uniaxial magnetoresistive angular displacement sensor. FIG. 23 shows the output voltage signals of the two orthogonal uniaxial magnetoresistive angular displacement sensors 5, 11 as a function of rotation angle α for one full rotation of the counting wheel 4, 10. The output curves are sinusoidal with 90 degree phase separation, thus representing sine and cosine functions, such that the angle may be calculated from the arctangent of the signals. Thus, from the foregoing analysis, we can see that the tunneling magnetoresistive angular displacement sensors 5, 11 positioned above the counting wheel 4, 10 can be used to determine the angle φ of the magnetic field, and because the encoder's permanent magnet rotation angle α is linearly related with the rotating magnet's angle it meets the requirements necessary to perform the absolute angle encoder measurement.

The above described preferred embodiments of the present invention do not limit the possible variations of the invention, and those skilled in the art can make various modifications and changes that do not exceed the scope of the invention. Any modification made within the spirit and principle of the present invention by replacement with equivalent or improved features falls within the scope of the present invention.

The invention claimed is:

1. A multiturn magnetic absolute encoder, comprising:
a first (M+1) counting unit, where M is an integer greater than or equal to 1;
a single turn signal processing unit; and
a multiturn signal processing unit,
wherein, each counting unit includes:
a permanent magnet coaxially mounted in a counting wheel; and
a tunneling magnetoresistive angular displacement sensor to detect the magnetic field component produced by the permanent magnet in the detection plane of the permanent magnet and output a signal, the permanent magnet has a cylindrical ring structure, and contains a first permanent magnet unit and a second permanent magnet unit, where the first permanent magnet unit and the second permanent magnet unit are symmetrically located with respect to the diametral cross section of the permanent magnet, the magnetization of the first permanent magnet unit and the magnetization of the second permanent magnet unit are parallel to the central axis cylindrical ring permanent magnet, but aligned in opposite directions, or the magnetization of the first permanent magnet unit and the magnetization of the second permanent magnet unit are aligned perpendicular to the diametral cross-sectional plane of the cylindrical ring permanent magnet, and aligned in same direction, within each counting unit, the tunneling magnetoresistive angular displacement sensor located in a specific region of the detection plane of the cylindrical ring permanent magnet within a certain radial distance from the cylindrical ring permanent magnet's axis, inside this region defined by this specific radius, the permanent magnet produces a magnetic field in the detection plane with a component oriented at an angle that is linearly related to the rotation angle of the rotating permanent magnet, a single turn processing unit to process the output signal of the first counting unit in order to calculate a code representative of the absolute rotational position of the counting wheel within one rotation, and a multiturn signal processing unit to calculate and output the integer number of rotations of the input shaft using sensor signals from the second to the M+1 counting units.

2. The multiturn magnetic absolute encoder of claim 1, wherein the first counting wheel is directly fixed to the input shaft.

3. The multiturn magnetic absolute encoder of claim 1, wherein the second counting unit to the M counting unit each includes a reduction gear set, wherein each counting gear set output shaft is the input shaft of the next counting unit, and a counting wheel is fixed on the output shaft, additionally a multiturn signal processing unit is used to calculate and output the number of rotations of each input shaft from the tunneling magnetoresistive angular displacement sensor signals of each counting wheel.

4. The multiturn magnetic absolute encoder of claim 1, wherein the value of M ranges from 1 to 10.

5. The multiturn magnetic absolute encoder of claim 1, wherein the number of revolutions of counting wheel m relative to counting wheel m+1 has a turns ratio of N:1, where m is an integer from 1 to M, and N is an integer greater than 1.

6. The multiturn magnetic absolute encoder of claim 5, wherein the number of revolutions of counting wheel m relative to counting wheel m+1 has a turns ratio of 10:1.

7. The multiturn magnetic absolute encoder of claim 1, wherein the permanent magnet has an outer diameter of 3 to 200 mm, an inner diameter of 1 to 100 mm, and a thickness of 1 to 50 mm.

8. The multiturn magnetic absolute encoder of claim 1, wherein the tunneling magnetoresistive angular displacement sensor includes two orthogonal uniaxial angle sensors or a biaxial tunneling magnetoresistive angular displacement sensor with two Wheatstone bridge sensors rotated at 90 degrees with respect to each other.

9. The multiturn magnetic absolute encoder of claim 1, wherein the permanent magnets have a detection plane that is located adjacent and parallel to the end circular face of the permanent magnet.

10. The multiturn magnetic absolute encoder of claim 1, wherein the tunneling magnetoresistive angular displacement sensors are located in the detection surface of the permanent magnet within a distance of 1 to 5 mm from the circular end face.

11. The multiturn magnetic absolute encoder of claim 1, wherein the magnetization of the first permanent magnet unit and the magnetization of the second permanent magnet unit are the same size.

12. The multiturn magnetic absolute encoder of claim 1, wherein, the permanent magnet is composed one or more of the following materials including $RECo_5$, where RE=Sm and/or Pr; $RE_2TM_{17}$, where RE=Sm, TM=Fe, Cu, Co, Zr and/or Hf; $RE_2TM_{14}B$, where RE=Nd, Pr, and/or Dy, TM=Fe and/or Co; FeCrCo alloy; an NbFeB alloy, or the permanent magnet is comprised of permanent magnet powder embedded in plastic, rubber, or a resin composite.

* * * * *